United States Patent [19]

Ida

[11] Patent Number: 4,473,730

[45] Date of Patent: Sep. 25, 1984

[54] LIQUID-LEVEL DETECTION SWITCH

[75] Inventor: Yuichi Ida, Miyagi, Japan

[73] Assignee: Alps Electric Co., Ltd., Japan

[21] Appl. No.: 431,325

[22] Filed: Sep. 30, 1982

[30] Foreign Application Priority Data

Jan. 20, 1982 [JP] Japan .............................. 57-5993[U]

[51] Int. Cl.$^3$ ...................... H01H 35/18; G01F 23/10; G08B 21/00

[52] U.S. Cl. .................................... 200/84 R; 340/624

[58] Field of Search ............. 200/84 R; 340/623, 624; 73/305, 308, 319

[56] References Cited

U.S. PATENT DOCUMENTS 1,718,241 6/1929 Laas .................................. 200/84 R
1,768,446 6/1930 Gron ............................... 340/624 X
2,661,411 12/1953 Berger .............................. 200/84 R
2,780,692 2/1957 Hinojosa ........................... 200/84 R
2,915,605 12/1959 Friedell ........................... 340/624 X
3,611,285 10/1971 Eggstein ......................... 340/624 X
4,087,663 5/1978 Sawyer ............................ 200/84 R

*Primary Examiner*—J. R. Scott
*Attorney, Agent, or Firm*—Guy W. Shoup; Gerard F. Dunne

[57] ABSTRACT

The invention relates to a liquid level detection switch which is provided in a casing with a plurality of terminals having fixed contacts and a signal-outputting portion and with a float having a movable contact to contact with the fixed contacts moving vertically within the casing so that the movable contact contacts or separates from the fixed contacts as the float moves vertically.

2 Claims, 11 Drawing Figures

LIQUID-LEVEL DETECTION SWITCH

FIELD OF THE INVENTION

This invention relates to a liquid-level detection switch which can be installed within a fuel or engine oil tank of an automobile or the like to detect the liquid level so as to operate when the liquid level goes above or below certain values, so as to give such information to a driver.

BACKGROUND OF THE INVENTION

Generally, automobiles or motorcycles are subject to vibration while running which leads to large variations in the liquid level within an oil tank, so that a liquid level detection switch may repeatedly go on and off in a chattering manner due to the variation, which may decrease the lifetime of the switch and may also distract the driver. Furthermore, the switch may be used in a wide temperature range, whereby a high reliability is required. A low manufacturing cost is also desired.

An explanation will be given of a conventional oil-level detection switch shown in FIG. 1 to 3, in which the driver is notified of a nead for oil when the engine oil is less than a certain amount. In the drawings, reference numeral 1 designates a pipe, the lower end of which has outwardly extending flanges receiving a support 2 of synthetic resin, the support 2 carries fixed contacts 3*a* and 3*b* comprised of a resilient metal mounted by rivets 5*a* and 5*b* respectively, and these contacts 3*a* and 3*b* form contacts 4*a* and 4*b* as shown in FIGS. 2 and 3. Wires 6*a* and 6*b* having at one end a connector 13 are inserted through the pipe 1 and soldered at the other ends to the rivets 5*a* and 5*b*, respectively.

A float 7 of foamed resin lower in specific gravity than oil has on at its lower end a movable ring-shaped contact 8 and is inserted so as to move vertically on the pipe 1. The liquid level S-S′ is shown in FIG. 1, in which the float 7 is kept floating at an intermediate portion of the pipe 1.

At the upper end of the pipe 1 is provided a rubber casing 11 and a spacer 10 which are held by a ring 19 fitted into a groove 14, the casing 11 and spacer 10 being locked by a flange at the upper end of the pipe. Adhesive 12 is filled into a bore 15 provided at the center of casing 11 so as to fix the wires *6a L and 6b* and close the upper opening to prevent oil leakage.

The flot 7 moves downward as the liquid level S-S′ drops and, at its lower position, the movable contact 8 finally contacts the contacts 4*a* and 4*b* to make the fixed contacts 3*a* and 3*b* conductive to turn on the switch.

When oil is filled into the tank in this condition, the float 7 rises to automatically turn off the switch.

Chattering occurs in the conventional oil-level detection switch, however, because the liquid level S-S′ is varying due to the vehicle's motion to vertically move the float 7 to repeat the connection and disconnection of the movable contact 8 and fixed contacts 3*a* and 3*b* even when the switch is on, which is not preferable for liquid level detection. The chattering will also occur even when the float 7 rises only slightly to turn off the switch.

Furthermore, the conventionl liquid level detection switch is structurally defective in that, caulking is frequently necessary because of the upper and lower flanges of the pipe 1, the fixed contacts 3*a* and 3*b* are riveted by rivets 5*a* and 5*b*, the wires 6*a* and 6*b* are soldered to the rivets, and a connector 13 needs to be used for the wires; thereby increasing the member of parts and manufacturing processes to result in a high manufacturing cost.

OBJECTS OF THE INVENTION

An object of the invention is to provide a liquid level detection switch free from the above defects.

The above and other objects and novel features of the invention will be apparent from the following detailed description in accordance with the accompanying drawings.

DETAILED DESCRIPTION OF THE INVENTION

Figure 1:
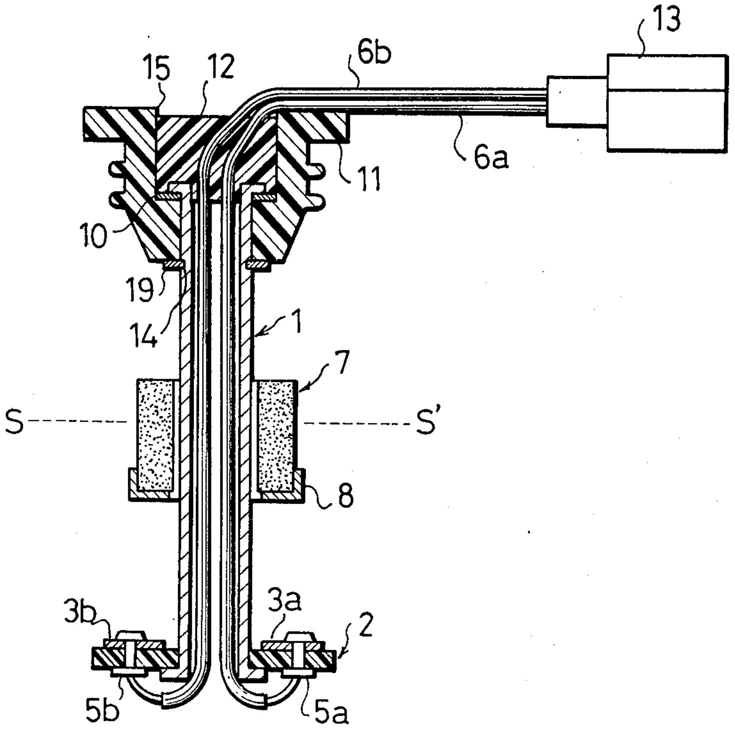
PRIOR ART Fig.1
FIG. 1 is a sectional view of a conventional liquid level detection switch.
Figure 2:
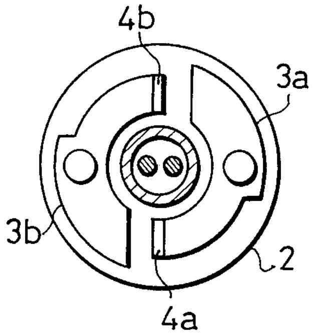
PRIOR ART Fig.2
FIG. 2 is a plan view of a support 2 thereof.
Figure 3:
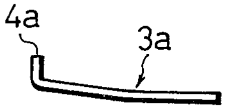
PRIOR ART Fig.3
FIG. 3 is a side view of a fixed contact of the same.

Referring to FIGS. 4 through 10, reference numeral 20 designates an insulated casing of a pipe-like shape. A rubber ring 21 is slid onto the upper periphery of the casing 20 from below thereof and held between a flange 2*a* and a step portion 20*a*′ of the casing 20, the rubber ring 21 serving to prevent oil leakage through the gap between a bore in an oil tank when the switch is incorporated into the bore in the tank.

Figure 5:
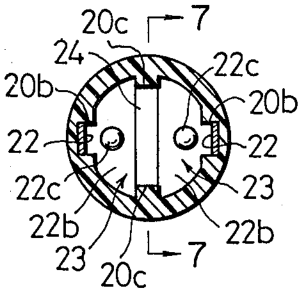
FIG. 5 is a sectionl view taken on the line 5—5 in FIG. 4.

The casing 20 and rubber member 21 may be integral with each other according to the quality of the casing 20, and the casing 20 may be open at the lower end. Reference numeral 20*b* designates guide grooves provided along the inner periphery of the casing 20, 20*c* designates projections for fixing a fixed contact to be described below, 20*d* designates an air vent and 22 designates terminals provided along the guide grooves 20*b* in the insulating casing 20. Each terminal 22 is formed at one end with a male blade 22*a* and bent perpendicularly at the other end to be substantially L-shaped. A hemispherical projection 22*c* is provided at the center of each flat semicircular portion 22*b* of the L-shaped portion , and portion 22*b* has a size about half of the inner diameter of the casing 20 as can be seen in FIG. 5, thus forming each fixed contact 23. The terminals 22 project upward from a partition 20*e* in the upper portion of the casing 20 through a pair of rectangular slots 20*f*.

Referring to FIG. 5, the pair of fixed contacts 23 are opposite to each other with a suitable distance between the projections 20*c*, and are thus electrically insulated from each other. The fixed contacts 23 are positioned by the guide grooves 20*b*, and stepped portions 20*g* (see FIG. 7). An adhesive may be filled into the recess 20*h* at the upper portion of the casing 20 to fix the terminal ends 22*a* and prevent oil leakage through the slots 20*f*.

Figure 8:
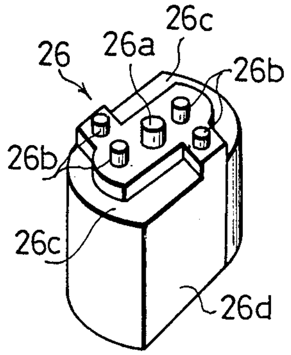
FIG. 8 is a perspective view of a float.

Reference numeral 26 designates a float vertically movable within the insulating casing 20. The float 26 is formed of a material smaller in specific gravity than oil, and, as shown in FIG. 8, has a projection 26*a* serving as a stopper when the float 26 moves downward, a plurality of projections 26*b* for fixing a movable contact to be described below, and a pair of step-like recesses 26*c* recessed from the surface containing the projections 26*a* and 26*b*. The float 26 is approximately columnar and has at opposite sides a pair of flat portions 26*d*.

Figure 9:
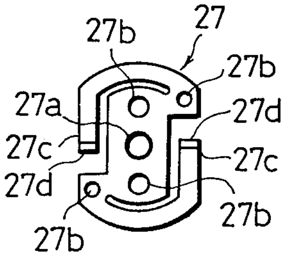
FIG. 9 is a plan view of a movable contact.

A movable contact 27, shown in FIG. 9, is formed of a resilient metallic plate and has at its center a bore 27*a* through which the projection 26*a* of the float 26 can pass and a plurality of bores 27*b* through which the projections 26*b* of the float 26 can pass. Further, the movable contact 27 has a pair of arms 27*c* forming a circular arc, with each having at the end thereof a contact portion 27*d* bent at a right angle from the plane of the arms. The movable contact 27 engages with the projections 26*b* of the float 26 and is fixed thereto by calking the projections 26*b*.

Figure 10:
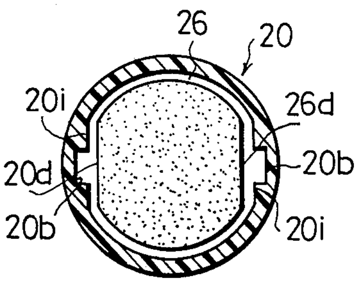
FIG. 10 is a sectional view taken on the line 10—10 in FIG. 4.

The float 26 fixedly supporting the movable contact 27, as shown in FIG. 10, is restricted from rotation by opposed flat portions 20*i* formed in the inner periphery of the casing 20, and the contacts 27*d* of the moveable contact 27 are held opposite to a respective one of the fixed contacts 23 of the terminals 22. The float 26 floating with the liquid level will move vertically as the oil level S-S' in FIG. 4 moves vertically.

The oil enters the casing 20 through the gap 24 between the fixed contacts 23 and air in the casing 20 vents through the air vent 20*d*, thereby making the oil level within the switch the same as the outside the same. In addition, the recesses 26*c* of the float 26 each serve as an escape portion for receiving the arms 27*c* of the movable contact 27 when the float is fully lowered.

Figure 4:
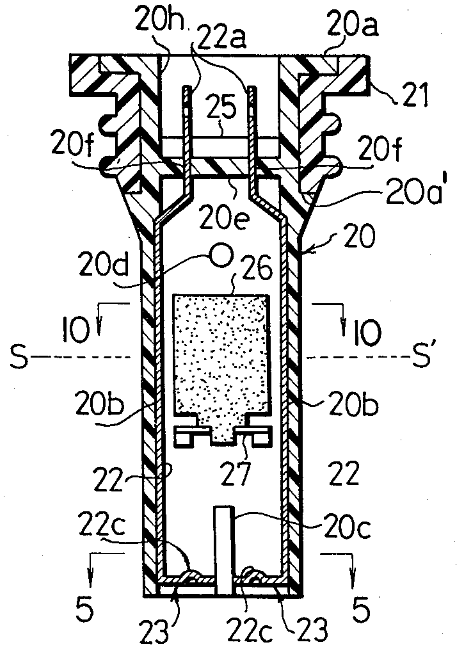
FIG. 4 is a sectional view of an embodiment of a liquid level detection switch of the invention.

The liquid level detection switch of the invention constructed as above allows the float 26 to move downward as the liquid level S-S' in FIG. 4 drops and the movable contact 27 contacts with the fixed contacts 23 to thereby make the pair of terminals 22 conductive when the float is fully lowered. When the float 26 is fully lowered, the bottom opening of casing 20 is made as small as possible by means of the fixed contacts 23 and projection 26*a*, so that the liquid level in the switch is stable and chattering hardly occurs, to thereby prolong the life span of the switch remarkably.

Figure 6A:
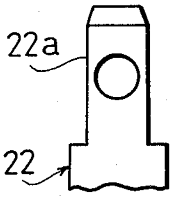
FIG. 6 represents a terminal, in which FIG. 6-(A) is a front view of the terminal, and FIG. 6-(B) is a side view thereof.
Figure 6B:
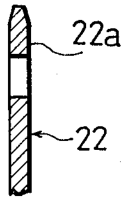
Figure 7:
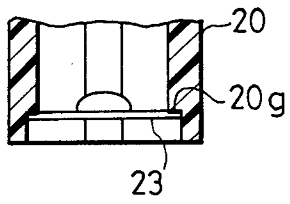
FIG. 7 is a sectional view taken on the line 7—7 in FIG. 5.

A separate cylindrical portion is provided in the casing not only to prevent variation, but also the cylindrical casing 20 supports the terminals 22 and rubber member 21 and is integral with the partition 20*e* and the terminal ends 22*a* through which lead wires are brought to the exterior as shown in FIG. 6-(A), thereby contributing to the simplification of the construction. In some cases, the terminals 22 may be insert during the molding of the casing 20.

There is no need to provide a central pipe, supports for the fixed contacts, and connections of the pipe and supports, and also no need for using many parts and process for connecting the switch in the bore in the tank as is conventional, whereby the integrated switch of the invention can be connected very easily to the tank.

Furthermore, the conventional switch, for outputting a signal to the exterior, requires wires to be soldered to the fixed contacts, the troublesome process of inserting the wires through the switching, and the connectors necessary to be attached to the wires, thus being expensive to produce. On the contrary, the present invention provides terminals 22 extending upward to be formed into the male blades as shown in FIG. 6-(A) thereby requiring no soldering, and simplifying electrical connections considerably, resulting in a lower probability of the occurrence of a poor connection.

As seen from the above, the liquid level detection switch of the invention provides the terminals 22 each having at one end the fixed contact 23 opposite to each other and at the other end the signal output portions and allows the float 26 carrying the movable contact 27 to move vertically in association with the liquid level within the casing and the movable contact to contact with the fixed contacts, thereby eliminating vibration to minimize the occurrence of chattering, thus being high in reliability, simple in construction, and inexpensive to produce.

Alternatively, the movable contact need not be of a resilient metallic plate, and the signal-fetching portion may, of course, connect the wires and connectors to the terminals 22.

Furthermore, the fixed contacts 23 need not be semi-circular, but may alternatively have L-shaped ends opposite to the fixed contacts.

While a preferred embodiment of the invention has been described using specific terms, such a description is for illustrative purpose only, and it is to be understood that changes and variations may be made without departing from the spirit or scope of the following claims.

What is claimed is:

1. A switch for noting a low level of liquid within a tank, comprising a casing adapted to be fitted within said tank and having an opening for entry of said liquid in a lower portion thereof, a plurality of elongate terminals fitted along opposing side walls of said casing, said elongate terminals having connection portions extending outwardly from an upper portion of said casing and lower portions bent inwardly towards one another in the lower portion of said casing, and a float movable vertically within said casing with the level of liquid therein and carrying at its lower portion a contact bridging the lower portion of said elongate contacts when said float is fully lowered in said casing, said contact having a planar central portion fitted to the underside of said float and arcuate arm portions extending coplanar with said central portion and adapted to contact resiliently a respective lower portion of said elongate terminals, and the underside of said float having a recess above each respective arm portion to enable said arm portions to deflect upwardly as the float descends to bring said arm portions into resilient contact with said lower portions of said elongate terminals.

2. A switch according to claim 1, said lower portions of said elongate terminals extending towards one another across the bottom wall of said casing, with said opening being formed in said bottom wall between said lower portions.

* * * * *